(12) United States Patent
Huber-Haag

(10) Patent No.: US 8,939,326 B2
(45) Date of Patent: Jan. 27, 2015

(54) DISPENSING CONTAINER FOR PROBIOTICS

(75) Inventor: Karl-Josef Huber-Haag, Pully (CH)

(73) Assignee: Nestec S.A., Vevey (CH)

(*) Notice: Subject to any disclaimer, the term of this patent is extended or adjusted under 35 U.S.C. 154(b) by 35 days.

(21) Appl. No.: 13/704,002

(22) PCT Filed: May 27, 2011

(86) PCT No.: PCT/EP2011/058742
§ 371 (c)(1),
(2), (4) Date: Dec. 13, 2012

(87) PCT Pub. No.: WO2011/157531
PCT Pub. Date: Dec. 22, 2011

(65) Prior Publication Data
US 2013/0087471 A1   Apr. 11, 2013

(30) Foreign Application Priority Data
Jun. 14, 2010  (EP) .................................... 10165810

(51) Int. Cl.
*B65D 37/00* (2006.01)
*A23L 1/30* (2006.01)
*B65D 1/02* (2006.01)
(Continued)

(52) U.S. Cl.
CPC ............... *B65F 77/22* (2013.01); *A23L 1/3014* (2013.01); *B65D 1/0238* (2013.01); *B65D 1/095* (2013.01); *B65D 77/08* (2013.01); *B65B 1/00* (2013.01);
(Continued)

(58) Field of Classification Search
CPC ............. B65B 1/00; B65B 3/003; A61J 1/00; A23L 1/3014; B65D 77/08; B65D 77/28; B65D 2221/00; B65D 2231/00; B65D 1/0238; B65D 1/095

USPC ............................. 222/206, 212–215, 541.9; 424/93.1–93.73, 1.25, 93; 422/548; 426/61; 604/416
See application file for complete search history.

(56) References Cited

U.S. PATENT DOCUMENTS 5,259,535 A * 11/1993 Boyte, Sr. ...................... 222/207
5,707,353 A * 1/1998 Mazer et al. .................... 604/83
(Continued)

FOREIGN PATENT DOCUMENTS

EP 1952703 8/2008
FR 2786197 5/2000
(Continued)

OTHER PUBLICATIONS

PCT International Search Report for Application No. PCT/EP2011/058742 with a Mailing Date of Sep. 16, 2011; 2 pages.
(Continued)

*Primary Examiner* — Lien Ngo
(74) *Attorney, Agent, or Firm* — K&L Gates LLP

(57) ABSTRACT

The present invention proposes a dispensing container (1) A for probiotics (2) in a viscous or liquid carrier (3), the probiotics (2) having a higher specific weight than the viscous or liquid carrier (3), wherein the container (1) comprises a reservoir (4) for holding the carrier (3) and a dispensing head (5) being in fluid connection with the reservoir (4), the dispensing head (5) comprising at least one outlet (6), wherein the concentration of the probiotics (2) decreases from the outlet (6) of the dispensing head (5) towards a bottom portion (1a) of the reservoir (1).

18 Claims, 2 Drawing Sheets

(51) Int. Cl.
  *B65D 1/09* (2006.01)
  *B65D 77/08* (2006.01)
  *B65B 1/00* (2006.01)

(52) U.S. Cl.
  CPC ......... *B65D 2221/00* (2013.01); *B65D 2231/00* (2013.01)
  USPC .......................................... 222/206; 604/416

(56) References Cited

U.S. PATENT DOCUMENTS

| | | | | |
|---|---|---|---|---|
| 5,868,285 | A | * | 2/1999 | Boyte, Sr. ...................... 222/212 |
| 5,965,128 | A | * | 10/1999 | Doyle et al. ............... 424/93.48 |
| 7,490,744 | B2 | * | 2/2009 | Matsumoto et al. ........... 222/494 |
| 8,048,320 | B2 | * | 11/2011 | Leach et al. ................... 210/782 |
| 8,087,547 | B1 | * | 1/2012 | Lindsey ........................ 222/184 |
| 8,523,837 | B2 | * | 9/2013 | Wiggins et al. ............... 604/414 |
| 8,801,688 | B2 | * | 8/2014 | Wiggins et al. ............... 604/414 |
| 2001/0036453 | A1 | * | 11/2001 | Reid et al. .................... 424/93.3 |
| 2004/0053798 | A1 | | 3/2004 | Kasturi et al. |
| 2008/0161756 | A1 | | 7/2008 | Soerensen |
| 2010/0314418 | A1 | * | 12/2010 | Roth et al. .................... 222/205 |
| 2012/0156177 | A1 | * | 6/2012 | Scarpone ..................... 424/93.7 |
| 2012/0244257 | A1 | * | 9/2012 | Lanctuit et al. ................. 426/61 |

FOREIGN PATENT DOCUMENTS

| | | |
|---|---|---|
| JP | 09-283113 | 10/1997 |
| JP | 2006-246835 | 9/2006 |
| WO | 02/096774 | 12/2002 |
| WO | 2007003891 | 1/2007 |
| WO | 2008062203 | 5/2008 |
| WO | 2009092628 | 7/2009 |

OTHER PUBLICATIONS

Written Opinion of the PCT International Search Report for Application No. PCT/EP2011/058742 with a Mailing Date of Sep. 16, 2011; 5 pages.

Chinese Office Action in 201180029303.0 mailed Jun. 3, 2014. 15 pages.

* cited by examiner

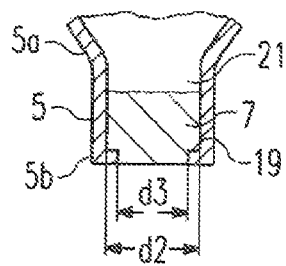
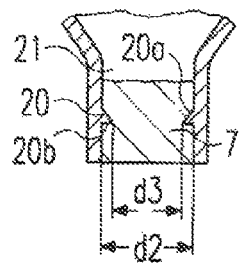
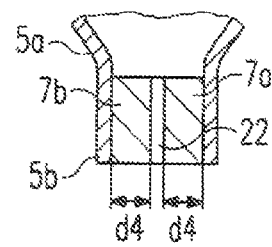
Fig. 3a    Fig. 3b    Fig. 3c
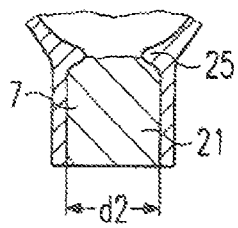
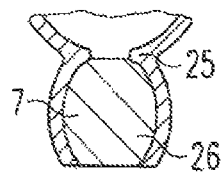
Fig. 4a    Fig. 4b
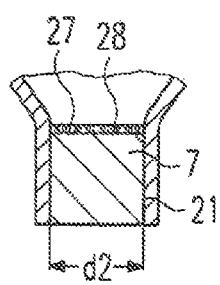
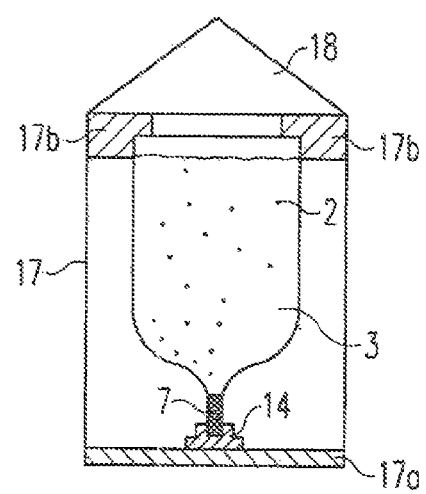
Fig. 4c    Fig. 5

DISPENSING CONTAINER FOR PROBIOTICS

CROSS REFERENCE TO RELATED APPLICATIONS

The present application is a National Stage of International Application No. PCT/EP2011/058742, filed on May 27, 2011, which claims priority to European Patent Application No. 10165810.2, filed on Jun. 14, 2010, the entire contents of which are being incorporated herein by reference.

FIELD OF THE INVENTION

The present invention generally relates to the field of dispensing containers for probiotics. More particularly, the present invention relates to a dispensing container having enhanced plugging means for enabling the storage and release of a non-homogeneous composition comprising probiotics.

BACKGROUND OF THE INVENTION

Probiotic micro-organisms are micro-organisms which beneficially affect a host by improving its intestinal microbial balance (Fuller, R; 1989; /. Applied Bacteriology, 66: 365-378). According to the currently adopted definition by FAO/WHO, probiotics are: "Live microorganisms which when administered in adequate amounts confer a health benefit on the host". Often probiotic micro-organisms ("probiotics") produce organic acids such as lactic acid and acetic acid which inhibit the growth of pathogenic bacteria such as *Clostridium perfringens* and *Helicobacter pylori*. Consequently, probiotic bacteria are believed to be useful in the treatment and prevention of conditions caused by pathogenic bacteria. Further, probiotic micro-organisms are believed to inhibit the growth and activity of putrefying bacteria and hence the production of toxic amine compounds.

It is also believed that probiotic bacteria activate the immune function of the host.

A very important field of application of probiotic bacteria is the field of infant formulas. Typical representatives of probiotics in this field are lactic-acid producing bacteria, such as e.g. probiotic *Bifidobacterium lactis*, BIFIDUS BL.

In the prior art, several possibilities are known to provide a probiotic composition to the end user respectively the infant.

A very common way is to admix powdered probiotics into infant formula in powdered form. Several infant and follow-up formulas containing probiotic microorganisms that follow this principle are commercially available; for example the BIO NAN formula (Nestle SA).

However, when offering the infant formula and the probiotics separately, i.e. especially not in a mixed state, there's a potential problem of the user not, or at least not in the proper dosage, admixing the probiotics to the infant formula after having reconstituted the infant formula, which usually will be presented in dry form (powder, tablet).

Therefore, another approach is to provide a single-use or monodose packaging that contains a predefined amount of probiotics mixed in an appropriate solution such as e.g. an oily matrix.

Accordingly, a user can be prevented from admixing a wrong or at least not a proper dosage of probiotics to the infant formula.

However, a drawback of this approach is that probiotics contained in a viscous carrier such as e.g. an oily matrix are generally prone to sedimentation and will thus form a non-homogeneous solution within the packaging. Hence, during the serving of the solution sediments of the probiotics are likely to be withheld within the packaging and thus, the full release of all probiotics contained within the packaging during the serving process cannot be assured.

Accordingly, it is desired to provide a packaging that enables the full release of all probiotics contained in the solution in order to provide the correct dose of probiotics to be dispensed from the packaging during the serving process.

One known approach to overcome this problem is to provide solubilization agents or stabilizers to ensure a homogenous solution within the packaging such that the e.g. liquid or viscous carrier can then be fully expelled during the serving of the composition. Accordingly, no sediments or solid particles of probiotic will be withheld during serving from the packaging.

However, for delicate, regulated compositions such as infant formula, it is desired to omit any additional components such as stabilizers, emulsifiers or gelling agents which may have a negative influence on the consumer's health.

Therefore, an improved packaging container is sought-after which enables the storage and the enhanced release of a predefined amount of a non-homogeneous solution containing probiotics.

The present invention seeks to address the above-described problems. The invention also aims at other objects and particularly the solution of other problems as will appear in the rest of the present description.

OBJECT AND SUMMARY OF THE INVENTION

In a first aspect, the present invention relates to a dispensing container for a probiotic in a viscous or liquid carrier, the probiotic having a higher specific weight than the viscous or liquid carrier, wherein the container comprises a reservoir for holding the carrier and a dispensing head being in fluid connection with the reservoir, the dispensing head comprising at least one outlet, wherein the concentration of the probiotic decreases from the outlet of the dispensing head towards a bottom portion of the reservoir.

According to the invention, a ready-to-feed single-serve portion of a non-homogeneous solution of probiotic is provided. The solution containing a predefined amount of probiotics can thus be easily administered to a user or can be mixed with a portion of infant formula.

As used herein, the term "specific weight" (also known as the unit weight) relates to the weight per unit volume of a material.

The term "concentration" relates to the relative amount of a given substance contained within a solution or in a particular volume of space.

The term "user" means a subject who receives the composition contained in the dispensing container. The contents of the dispensing container can be administered by the user or by another person such as e.g. a parent or a caregiver.

According to the present invention, the concentration of the probiotics in the viscous or liquid carrier is highest at the outlet of the dispensing head and decreases from the outlet of the dispensing head towards a relatively lower arranged bottom portion of the reservoir, although the specific weight of the probiotics lies above the specific weight of the carrier. Hence, an inverted concentration of the probiotic particles within the liquid carrier is provided.

Due to the provision of a high concentration of the probiotic at the outlet of the dispensing container it can be effectively ensured that during a dispensing process most of the solid probiotic particles are expelled from the container and thus, withholding respectively retaining of probiotics particles within the container can be minimized.

Accordingly, even though a non-homogenous solution is present within the container, the ejection properties of the container ingredients, the liquid or viscous carrier and the probiotic particles, are enhanced. In particular, a very accurate amount of probiotics can be administered to the user or to a receiving vessel in order to be mixed with an infant formula while at the same time, the use of additional components such as stabilizers, emulsifiers or gelling agents is prevented. It is to be noted that such an improved dispensing accuracy is particularly important when the user is a child or infant.

The concentration of the probiotic arranged at the outlet of the dispensing head is preferably 3 to 10 times the concentration of the probiotic contained in the liquid reservoir of the container.

Examples of suitable probiotic micro-organisms include yeasts such as *Saccharomyces, Debaromyces, Candida, Pichia* and *Torulopsis*, moulds such as *Aspergillus, Rhizopus, Mucor*, and *Penicillium* and *Torulopsis* and bacteria such as the genera *Bifidobacterium, Bacteroides, Clostridium, Fusobacterium, Melissococcus, Propionibacterium, Streptococcus, Enterococcus, Lactococcus, Staphylococcus, Peptostrepococcus, Bacillus, Pediococcus, Micrococcus, Leuconostoc, Weissella, Aerococcus, Oenococcus* and *Lactobacillus*. Specific examples of suitable probiotic micro-organisms are: *Saccharomyces cereviseae, Bacillus coagulans, Bacillus licheniformis, Bacillus subtilis, Bifidobacterium bifidum, Bifidobacterium infantis, Bifidobacterium longum, Enterococcus faecium, Enterococcusfaecalis, Lactobacillus acidophilus, Lactobacillus alimentarius, Lactobacillus casei* subsp. *casei, Lactobacillus casei Shirota, Lactobacillus curvatus, Lactobacillus delbruckii* subsp. *lactis, Lactobacil-2Q lus farciminus, Lactobacillus gasseri, Lactobacillus helveticus, Lactobacillus johnsonii, Lactobacillus reuteri, Lactobacillus rhamnosus (Lactobacillus GG), Lactobacillus sake, Lactococcus lactis, Micrococcus varians, Pediococcus acidilactici, Pediococcus pentosaceus, Pediococcus* 25 *acidilactici, Pediococcus halophilus, Streptococcusfaecalis, Streptococcus thermophilus, Staphylococcus carnosus*, and *Staphylococcus xylosus*.

The probiotic bacteria may be used live, inactivated or dead or even be present as fragments such as DNA or cell wall materials. In other words, the quantity of bacteria which the formula contains is expressed in terms of the equivalent colony forming units of bacteria irrespective of whether they are competely or partly, live, inactivated, dead or fragmented.

The probiotic bacterial strain may be any lactic acid bacteria or Bifidobacteria with established probiotic characteristics. The probiotic of the invention may be any probiotic bacteria or probiotic microorganism that have been or can be originated, found, extracted or isolated in milk upon excretion, preferably in human breast milk. Suitable probiotic lactic acid bacteria include *Lactobacillus rhamnosus* ATCC 53103 obtainable inter alia from Valio Oy of Finland under the trade mark LGG, *Lactobacillus rhamnosus* CGMCC 1.3724, *Lactobacillus reuteri* ATCC 55730 and *Lactobacillus reuteri* DSM 17938 obtainable from Biogaia, *Lactobacillus fermentum* VRI 003 and *Lactobacillus paracasei* CNCM 1-2116, *Lactobacillus johnsonii* CNCM 1-1225, *Lactobacillus Helveticas* CNCM 1-4095, *Bifidobacterium breve* CNCM 1-3865, *Bifidobacterium longum* CNCM 1-2618.

Suitable probiotic *Bifidobacteria* strains include *Bifidobacterium longum* ATCC BAA-999 sold by Morinaga Milk Industry Co. Ltd. of Japan under the trade mark BB536, the strain of *Bifidobacterium breve* sold by Danisco under the trade mark Bb-03, the strain of *Bifidobacterium breve* sold by Morinaga under the trade mark M-16V and the strain of *Bifidobacterium breve* sold by Institut Rosell (Lallemand) under the trade mark R0070. A particularly preferred *Bifidobacterium* strain is *Bifidobacterium lactis* CNCM 1-3446 which may be obtained from the Christian Hansen Company of Denmark under the trade mark Bb12. A mixture of suitable probiotic lactic acid bacteria and *Bifidobacteria* may be used.

The volume of the reservoir of the container preferably lies between 0.2 to 5 ml, more preferably between 0.5 and 3 ml.

The viscous or liquid carrier preferably contains between $10e4$ and $10e11$, preferably between $10e7$ and $10e9$ CFUs (Colony forming Units) of probiotic. It is to be understood that for a relative lower probiotic load respectively a lower amount of CFUs of probiotic within the viscous or liquid carrier a relative higher centrifugation time and/or a higher centrifugation speed may be required to induce an efficient aggregation of the probiotic particles.

The viscous or liquid carrier is preferably an oily matrix which can 10 be made e.g. from dry glycerides. Preferably, the oily matrix comprises medium chains triglycerides (MCT). Moreover, the oily matrix may as well comprise sugars. It is to be understood that the carrier can be any of a clear liquid, a paste, suspension, emulsion, micro-emulsion, or any other material having the general flow characteristics of a liquid.

In a preferred embodiment, the dispensing container is made of an integral plastic piece. Thereby, the container can be made from a thermoplastic or thermoset polymer by means of blow molding. Preferably, the used polymer is one that can be extruded such as for example, polyethylene, polypropylene, ethyl vinyl alcohol copolymer, cyclic olefin copolymer, cyclic olefin polymer, liquid crystal polymer, polyethylene terephthalate or a mixture of any of these.

The material of the dispensing container is preferably transparent or translucent. Accordingly, the user can determine the amount and/or the condition of the ingredients within the reservoir. Moreover, during the dispensing process, the user can determine whether the full amount of the ingredients within the reservoir has been expelled from the dispensing container.

The at least one outlet of the container is preferably arranged at a distal end of the dispensing head, opposite to a proximal end of the dispensing head that is connected to the liquid reservoir of the dispensing container.

The diameter of the at least one outlet of the container preferably lies between 0.5 mm and 5 mm, most preferably between 1 mm and 2 mm.

The dispensing head of the container may as well comprise more than one outlet to further enhance the dispensing properties of the container. Thereby, the cross sectional shape and/or the geometric form of the different outlets may vary for each of the outlets. The outlets may for example be funnel or channel-shaped. Preferably, the different outlets are arranged at the dispensing head at a position opposite to a bottom portion of the liquid reservoir of the container.

In a preferred embodiment, an aggregated portion of probiotic particles is present at the at least one outlet of the container. The portion of probiotic particles is preferably a sedimentation cake which is arranged to essentially plug the at least one outlet of the dispensing head. Accordingly, a plug of probiotic particles is arranged at respectively close to the at least one outlet of the container in order to close-off the container. Hence, leaking of the ingredients from the container can be effectively prevented.

The sedimentation cake respectively the plug of probiotic particles can be arranged at the at least one outlet by means of centrifugation for example. The arrangement of the sedimentation cake may as well be obtained by forcing the probiotic to sediment at the at least one outlet due to an intermediate storage orientation of the dispensing container with the outlet being held at a lower position relative to the liquid reservoir of the container for a predefined period of time.

Due to the centrifugation respectively sedimentation process that is preferably carried out directly after filling the probiotic into the container together with the liquid or viscous carrier, a stable arrangement of the aggregated portion of probiotic at the outlet of the dispensing head is obtained.

As an alternative, the dispensing container may as well be arranged in an external secondary packaging which is preferably arranged to close off and/or to seal the at least one outlet of the container during normal storage of the secondary packaging. Thereby, the dispensing container is preferably supported by the secondary packaging upside down, i.e. with the at least one outlet being arranged at a lower position compared to the liquid reservoir, in order to enhance the sedimentation process of the probiotic when the dispensing container is supported by the secondary packaging. In order to facilitate the sedimentation of the probiotic in the container, the secondary packaging preferably comprises orientation means that enable the correct positioning of the secondary packaging and thus, prevent the user from storing the secondary packaging in another than the desired orientation. The orientation means may be a specific shape of the secondary packaging such as for example a conical or triangular shape.

It is to be understood that the sedimentation properties of the probiotic may vary dependent on the specific kind of probiotic contained in the liquid or viscous carrier. Thereby, some of the above outlined examples of suitable probiotics may enable a more efficient sedimentation than others, dependent on their specific surface properties and/or secretion properties.

In a preferred embodiment, after successful sedimentation of the probiotic, the concentration of the probiotic at the outlet of the dispensing head is essentially not affected by the orientation of the dispensing container. Hence, the aggregated portion of the probiotic is arranged to be held in a stable position at the outlet of the dispensing head in order to provide a stable plug of the dispensing container, irrespectively of the container's orientation.

The container is preferably a squeezable single-use container. Thereby, the liquid reservoir is preferably arranged within a squeezable main body of the container.

As used herein, the term "squeezable" is understood to mean that the reservoir can be deformed or crushed with a resulting reduction in volume by squeezing the reservoir e.g. between the thumb and a finger of a user's hand.

Thus, when squeezing the reservoir of the container, a pressure is exerted onto the ingredients within the liquid reservoir, which thus exert a force directed from the inside of the container towards the exterior thereof. Accordingly, a pressing force is exerted onto the aggregated portion of probiotic particles arranged at the outlet of the container such that the aggregated probiotic particles are flushed out from the container outlet and are thus made to leave the container first. Then, as the outlet of the container is not plugged by the probiotic particles any longer, the liquid or viscous carrier is dispensed from the outlet by means of squeezing the container.

In another preferred embodiment, the container comprises a breakable seal arranged at the at least one outlet of the dispensing head. Thereby, the breakable seal is preferably connected to opening means in order to enable a user to easily break respectively open the seal and thus open the outlet of the dispensing container.

Accordingly, effective sealing of the container is obtained. Moreover, an additional closure of the container is provided and thus, leaking of the container can be prevented even before the sedimentation process respectively if the sedimentation of the probiotic at the outlet of the dispensing head is not yet completed.

The opening means are preferably a tip portion of the container connected to the breakable seal. Thereby, the tip portion is preferably designed for gripping between a thumb and a finger of a user.

In a preferred embodiment, the opening means are designed to be twisted by the user, thereby shearing respectively breaking the seal.

In a preferred embodiment, the dispensing head comprises retaining means designed to support the probiotic at the dispensing head and/or the outlet of the container.

Accordingly, the desired position of the probiotic particles within the dispensing container can be effectively ensured even if the container is subjected to external influences such as e.g. vibrations during transportation thereof.

The retaining means is preferably a geometrical obstacle formed integral with the dispensing head and/or the liquid reservoir.

The retaining means may as well be a diminution of the cross sectional area of the outlet of the dispensing head. Thereby, a diminution of the cross sectional area may as well be present between the dispensing head and the liquid reservoir of the container.

Accordingly, sedimented particles which are arranged at the outlet of the container are more likely to adhere onto the inner surface of the outlet and/or the dispensing head of the container and thus, a stable positioning of the sedimented particles is obtained.

In another preferred embodiment, the retaining means is a grid arranged at the outlet of the dispensing head. The retaining means may as well be a funnel arranged at the outlet respectively close to the outlet of the container.

In a preferred embodiment, the retaining means are preferably designed to be deformed and/or dislocated if pressure is applied into the container respectively the liquid reservoir of the container, e.g. by squeezing the container main body. Accordingly, during a dispensing from the container, the retaining means are enabled to contribute to the flushing of the probiotic particles arranged at the outlet of the container.

It is to be understood that the retaining means may as well be a specific surface design or a coating applied to an inner surface of the dispensing head and/or the outlet of the container. Thereby, the coating preferably increases the adhesion forces between the probiotic particles and the inner surface of the dispensing head and/or the outlet of the container.

Furthermore, the liquid or viscous carrier according to the present invention may as well contain other nutrients such as for example vitamins, prebiotics (oligossaccharides), minerals, trace elements, etc.

Thereby, the sedimentation of the probiotic within the container respectively at the outlet of the container may contribute to the preservation and/or the stability of the liquid or viscous carrier respectively the liquid contained within the container. Thus, for example, the compatibility between the liquid or viscous carrier and the contained probiotic may be enhanced. In a further aspect, the present invention relates to a method for enclosing a non-homogeneous solution of probiotic in a viscous or liquid carrier within a dispensing container, the method comprising the steps of:

filling the non-homogeneous solution in a reservoir of a dispensing container being connected to a dispensing head of the container having at least one outlet, closing the at least one outlet by means of externally provided sealing means, plugging the at least one outlet by specifically sedimenting the probiotic opposite to a bottom portion of the reservoir.

According to the present invention, an effective method of enclosing a non-homogenous solution of probiotic in a liquid or viscous carrier is provided, whereby a sedimentation plug of probiotic particles is arranged at the at least one outlet of the dispensing container. Thereby, the concentration of the probiotic is specifically increased at the dispensing head of the container such that during dispensing of the ingredients from the container withholding of probiotic particles within the container is minimized.

In a preferred embodiment, the plugging of the at least one outlet is obtained by a centrifugation of the dispensing container. Thereby, the centrifugation is preferably carried out directly after filling of the container with the ingredients. The centrifugation is preferably carried out for a predefined time period of about 30 to 120 seconds at a speed between 700 to 3500 RPM.

It is to be noted that the externally provided sealing means may be any means suitable for an intermediate closing of the outlet of the container in order to prevent leaking of the ingredients therefrom during the sedimentation process. Thereby, the sealing means is preferably an external plug provided to the container during sedimentation.

In another preferred embodiment, plugging of the outlet may as well be obtained by an intermediate storage of the container after the filling process. Thereby, the container is preferably stored for 5 to 24 hours upside down, i.e. with the outlet being arranged at a lower position relatively to the liquid reservoir of the container.

Moreover, the specific sedimentation of the probiotic within the container and thus, plugging of the at least one outlet may as well be obtained by arranging the container with the outlet facing downwards in an additional support packaging having external sealing means designed to seal the outlet during the sedimentation process.

According to this embodiment, the specifically directed sedimentation process is carried out within the additional support packaging such that a sedimentation cake respectively plug is created at the at least one outlet of the container.

BRIEF DESCRIPTION OF THE DRAWINGS

Further features, advantages and objects of the present invention will become apparent for the skilled person when reading the following detailed description of embodiments of the present invention, when taken in conjunction with the figures of the enclosed drawings.

FIG. 1b shows a bottom view of a preferred embodiment of the dispensing container according to FIG. 1a.

FIGS. 3a-3c show preferred embodiments of the dispensing head of the container according to the present invention.

FIGS. 4a-4c show preferred embodiments of the retaining means of the dispensing container according to the present invention.

FIG. 5 shows another preferred embodiment of the dispensing container according to the present invention being arranged in an additional support packaging.

DETAILED DESCRIPTION OF EMBODIMENTS

Figure 1A:
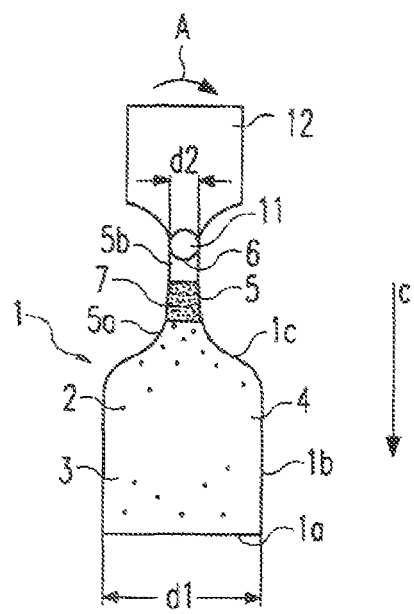
FIG. 1a shows a side view of a preferred embodiment of the dispensing container according to the present invention.
Figure 1B:
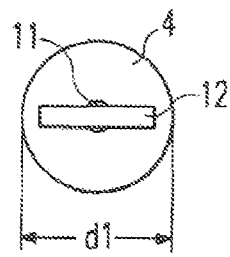

FIGS. 1a and 1b show a side respectively a bottom view of a preferred embodiment of the dispensing container 1 according to the present invention.

The dispensing container 1 is preferably made of a plastic material. Thereby, the material of the container 1 is preferably transparent or translucent in order to enable a user to inspect the ingredients within the container.

The dispensing container 1 comprises an essentially cylindrical main body 4 that serves as a liquid reservoir holding a predefined amount of preferably non-homogeneous solution. The volume of the liquid reservoir preferably lies between 0.2 to 5 ml, more preferably between 0.5 and 3 ml. It is to be understood that the main body may be of any geometrical shape which enables storage of the ingredients respectively the non-homogeneous solution.

The main body 4 comprises a bottom portion 1a and a sidewall portion 1b enclosing a defined volume of the liquid reservoir 4. At a portion opposite to the bottom portion 1a, the liquid reservoir 4 is connected to a dispensing head 5 of the container 1. Thereby, the liquid reservoir 4 and the dispensing head 5 are in fluid connection by means of liquid guiding means 1c. Said liquid guiding means enable a provision of liquid from the liquid reservoir 4 to the dispensing head 5. Moreover, the liquid guiding means are preferably arranged to enable a specific sedimentation of the probiotic within the dispensing container 1 as will be explained later with respect to FIGS. 2a and 2b.

The dispensing container further comprises an outlet 6 which is arranged at the dispensing head 5. The outlet according to this embodiment is preferably arranged on a tip portion of the dispensing head 5, opposite to bottom portion 1a of the liquid reservoir 4.

In particular, the dispensing head 5 comprises a proximal end 5a facing the guiding means 1c and a distal end 5b at which the outlet 6 is preferably arranged. According to this embodiment, the outlet 6 is arranged at the very end of the container 1 opposite to the liquid reservoir 4 such that dispensing from the container is facilitated and the dispensing of all ingredients contained within the liquid reservoir 4 is enabled.

The dispensing head 5 is preferably of reduced diameter d2 compared to the diameter d1 of the liquid reservoir 4. Moreover, the dispensing head 5 and/or the outlet 6 of the dispensing head 5 may be of varying cross sectional shape compared to the liquid reservoir 4. For example, the dispensing head 5 and/or the outlet 6 may have a cross sectional shape which is e.g. round, squared, triangular or of any other geometrical shape. As can be seen in FIG. 1a, the outlet 6 is preferably sealed by a breakable seal 11. Thereby, opening means 12 are connected to the breakable seal 11 which enable a user to open the seal by applying a predefined force such as e.g. a twisting motion onto the opening means 12 as indicated by arrow A. Accordingly, before the dispensing process, the opening means 12 which are preferably formed as an integral part with the rest of the container 1 can be sheared from the dispensing head 5 by the user, thereby breaking the seal 11 in order to open the distal end 5b of the dispensing head 5.

The opening means 12 are preferably made of the same material as the liquid reservoir 4 and the dispensing head 5 of the container 1. Moreover, as can be seen in FIG. 1b, the opening means 12 are preferably of squared cross sectional shape and offer a surface large enough to be gripped between a thumb and a finger of a user.

As can be seen in FIG. 1a, the liquid reservoir 4 comprises a non-homogeneous solution that preferably consists of a probiotic 2 in a liquid or viscous carrier 3. Thereby, the volume of the liquid reservoir 4 may not be completely filled with the non-homogeneous solution, thus gas may as well be present within the liquid reservoir 4.

Within the dispensing container 1, the concentration of the probiotic 2 decreases from the outlet 6 of the dispensing head 5 towards the bottom portion 1a of the reservoir 1, i.e. in the direction of arrow C. Thereby, the concentration of the probiotic 2 arranged at the outlet 6 of the dispensing head 5 is preferably 3 to 10 times the concentration of the probiotic 2 contained in the liquid reservoir 4 of the container.

In a preferred embodiment, the high concentration of the probiotic 2 forms an aggregated portion 7 of probiotic particles 2, which is preferably designed to plug the outlet 6 of the dispensing head 5. Accordingly, a plug of probiotic particles 2 is formed at the outlet 6, which contains the largest portion of the probiotic 2 present within the container 1. Hence, during dispensing of the ingredients 2,3 from the container 1, the plug 7 can be first expelled from the container 1 and thus, it can be ensured that the withholding of probiotic particles 2 within the container 1 during the dispensing process is minimized. Accordingly, a very accurate dose of probiotic can be administered to a user or to a mixing vessel that contains a portion of infant formula.

As indicated in FIG. 1a, the container 1 preferably comprises retaining means 10 which are preferably located between the outlet 6 and the liquid reservoir 4, more preferably between the dispensing head 5 and the liquid reservoir 4. The retaining means 5 are designed to enable a stable positioning of the probiotic particles 2 at the outlet 6 respectively at the dispensing head 5.

In particular, the retaining means 10 may be a diminution of the cross sectional area of the dispensing head 5 as indicated in FIG. 1a. Hence, a stable positioning of the probiotic particles 2 at the outlet 6 respectively within the dispensing head 5 is ensured.

The optional retaining means 10 according to FIG. 1a may as well be a grid or any other geometrical obstacle that is preferably formed integral with the dispensing head 5. Hence, the probiotic particles 2 arranged on the side of the retaining means 10 facing the outlet 6 are effectively prevented from yielding from the dispensing head 5 towards the other side of the retaining means 10 facing the liquid reservoir 4. Thus, irrespectively of the orientation of the container 1, a stable positioning of the plug 7 of the probiotic 2 is obtained.

Thereby, it is to be understood that the retaining means 10 are preferably designed to be deformed and/or dislocated during a dispensing from the container 1. Accordingly, the flushing from the probiotic plug 7 from the container 1 during the dispensing process is facilitated.

With respect to FIGS. 2a and 2b, another preferred embodiment of the dispensing container 1 according to the present invention and in particular the sedimentation process of the probiotic particles 2 will be described in the following.

Figure 2A:
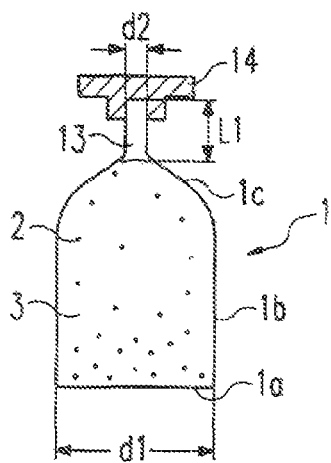
FIG. 2a shows another preferred embodiment of the dispensing container according to the present invention before the sedimentation process.
Figure 2B:
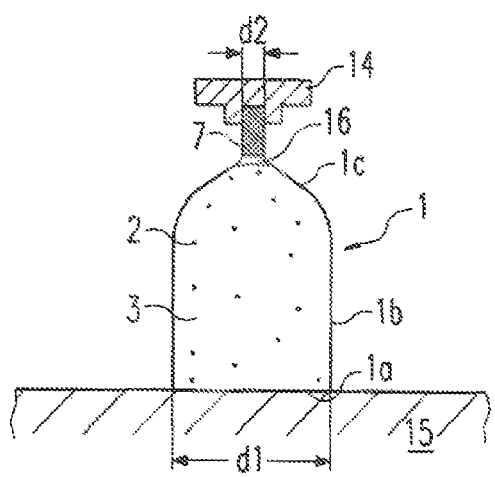
FIG. 2b shows the embodiment of the dispensing container according to FIG. 2a after the sedimentation process.

FIGS. 2a and 2b show an embodiment of the dispensing container 1 in which no sealing means are provided at the container 1. Thereby, in this embodiment, closing-off of the container is preferably solely obtained by the probiotic plug 7.

FIG. 2a relates to a state in which the non-homogeneous solution of liquid or viscous carrier 3 containing the probiotic particles 2 has been filled into the container 1. Thereby, in order to prevent spilling of ingredients 2, 3, the container 1 is preferably arranged with the outlet 6 at a position higher relative to the liquid reservoir 4. As can be seen in FIG. 2a, due to the sedimentation of the probiotic 2 within the container 1 which have a higher specific weight than the viscous or liquid carrier 3, a higher concentration of probiotic particles 2 is present at the bottom portion 1a of the liquid reservoir 4 compared to a portion of the liquid reservoir 4 facing the dispensing head 5. More particularly, the concentration of the probiotic 2 in this state decreases from the bottom portion 1a towards the dispensing head 5 arranged opposite to the bottom portion 1a of the container 1.

Preferably, a minimum sedimentation volume 13 defined by the length L1 and the diameter d2 of the dispensing head 5 is present at the dispensing head 5. This means that after filling of the dispensing container 1, a predefined minimum sedimentation volume 13 is designated for the sedimentation process and is thus not filled with the non-homogeneous solution. The sedimentation volume 13 preferably lies between 0.1 and 0.9 ml.

After filling of the container 1 with the ingredients, externally provided sealing means 14 are provided which are designed to close-off the at least one outlet 6 of the container 1. The sealing means 14 may be a part of a centrifugation device preferably used to enable a specific sedimentation of the probiotic 2 within the container 1. However, the sealing means 14 may as well be a part of an external packaging in which the container 1 is to be intermediately stored for a predefined time to enable sedimentation of the probiotic 2.

After the provision of the external sealing means 14, a specific sedimentation of the probiotic 2 is carried out. Thereby, the sedimentation is specifically carried out to make the probiotic 2 sediment at the outlet 6. The sedimentation of the probiotic 2 is preferably obtained by centrifugation of the container 1, at least for a predefined time period of about 30 to 120 seconds at a speed between 700 to 3500 RPM.

Due to the higher specific weight of the probiotic 2 within the liquid or viscous carrier 3, the probiotic 2 will form a sedimentation cake at the outlet 6 of the dispensing head 5. Accordingly, a solid probiotic plug 7 is formed at the outlet 6.

In a preferred embodiment, due to the predefined sedimentation volume 13, in the normal storage position as shown in FIG. 2b in which the dispensing container 1 is stored with its bottom portion 1a facing a support surface 15, the viscous or liquid carrier 3 is prevented from reaching to the probiotic plug 7 as an optional clearance distance 16 is preferably present between the liquid within the reservoir 4 and the solid probiotic plug 7.

In any case, due to the sedimentation process of the probiotic 2, a very solid plug 7 is preferably arranged at the outlet 6 and/or the dispensing head 5 of the container 1 which prevents any leaking of the container 1 irrespective of the container's orientation.

It is to be noted that the container preferably comprises guiding means 1c which are arranged between the liquid reservoir 4 and the dispensing head 5 of the container 1, which enable a specific guiding of the probiotic particles 2 towards an outlet 6 of the container 1. Thereby, the guiding means 1c are preferably a slanted inner surface of the container 1 arranged to connect the liquid reservoir 4 and the dispensing head 5. In particular, the guiding means 1c is preferably a funnel or hopper-shaped inner surface of the container 1 arranged with the narrow end towards the dispensing head 5 respectively towards the outlet 6. It is to be noted that the guiding means 1c may as well be a part of the dispensing head 5.

After the sedimentation process, the external sealing means 14 are preferably taken from the outlet 6 of the container 1, as the outlet 6 is now closed by the solid probiotic plug 7.

An alternative of sedimentation by means of centrifugation is an intermediate storage of the container 1 with applied external sealing means 14, whereby the container is stored with the outlet 6 at a lower position relative to the bottom portion 1a of the liquid reservoir 4.

Moreover, the container 1 may as well be arranged in an additional packaging 17 (see FIG. 5) in which the sedimentation is carried out during storage of the container within the packaging 17 before the dispensing process.

As can be seen in FIG. 5, the packaging 17 preferably comprises means 17a for supporting the externally provided sealing means 14. However, the sealing means 14 may as well be integrally formed with the packaging 17.

Moreover, the packaging 17 preferably comprises a support structure 17a, 17b for supporting the container 1 within the packaging 17 in a correct orientation. Thereby, the support structure 17a, 17b is preferably arranged to support the container 1 in a position in which the outlet 6 is arranged at a lower position relative to the liquid reservoir 4. Hence, due to the sedimentation of the solid probiotic particles 2 within the container 1 which are preferably guided to the outlet 6 respectively the dispensing head 5, a sedimentation cake respectively plug 7 is formed at the outlet 6 during storage of the container 1 within the packaging 17.

The packaging 17 preferably comprises orientation means 18 which enable the user to store the packaging in the correct orientation. For example, the packaging 17 may be of a particular shape to guide a user to apply a correct storage position of the packaging 17. For example, the packaging 17 may be of triangular of conical shape. As can be seen in FIG. 5, the top portion of the packaging 17 may comprise a conical or triangular orientation means 18 at a top portion thereof in order to prevent a user to store the packaging in the wrong orientation. In addition, the packaging 17 preferably comprises a printed label on its outer surface indicating a correct storage position to a user.

FIGS. 3a to 3d relate to preferred embodiments of the dispensing head 5 of the container 1 according to the present invention.

As can be seen in FIG. 3a, the outlet 6 preferably comprises at least one stepped portion 19 at which the inner diameter d2 is narrowed to an inner diameter d3. Thereby, the inner diameter d2 preferably lies between 0.5 mm and 5 mm, more preferably between 1 mm and 2 mm. The diameter d3 preferably lies within the range of 0.3 and 4.8 mm, more preferably between 0.8 mm and 1.8 mm. As can be seen in FIG. 3a, the reduced diameter d3 is preferably present at the outlet 6.

Thereby, the reduced diameter d3 is preferably of a resilient material such that when pressure is applied, i.e. by squeezing the container 1 during the dispensing process, the reduced diameter d3 deforms and in particular widens in order to expel the whole sedimentation plug 7 from the container 1.

It is to be noted that the reduced diameter d3 may as well be present at another portion of the dispensing head 5, i.e. not directly at the distal end and thus at the outlet 6 thereof.

As can be seen in FIG. 3b, the dispensing head 5 may as well comprise integral supporting means 20 preferably formed integral with the dispensing head 5. Thereby, the retaining means 20 may be a portion of reduced diameter d3.

Preferably, the supporting means 20 are anchoring means which enable a stable positioning of the probiotic plug 7 at the outlet 6 of the dispensing container 1. Thereby, the anchoring means 20 preferably comprise an slanted portion 20a directed towards a side of the dispensing head 5 facing the liquid reservoir 4 and a portion perpendicularly arranged to the orientation of the liquid channel 21 within the dispensing head 5. The anchoring means 20 are preferably circumferentially arranged at the liquid channel 21. However, the anchoring means 20 may as well be one solid anchoring ring integrally formed within the liquid channel 21. Thereby, the anchoring means 20 preferably deform during an applied pressure, i.e. when squeezing the container 1, in order to contribute to the ejection of the whole probiotic plug 7. Moreover, due to the slanted portion 20a, the plug can effectively be held at the desired portion of the dispensing head 5 wherein at the same time, effective ejecting of the plug 7 from the outlet 6 can be ensured.

As indicated in FIG. 3c, the dispensing head 5 may as well comprise more than one outlet at the distal end 5b thereof. Thereby, the at least two outlets 6a, 6b are preferably of equal diameter d4 such that during sedimentation at least two sedimentation plugs 7a, 7b are formed at the outlets 6a, 6b. Thereby, a separation wall 22 dividing the liquid channel 21 into at least two outlets 6a, 6b is arranged within the dispensing head 5.

FIGS. 4a to 4c show preferred embodiments of the retaining means 10 of the dispensing container 1 according to the present invention. Thereby, the retaining means 10 are preferably arranged between the liquid reservoir 4 and the dispensing head 5 in order to prevent the sedimentation plug 7 formed during the sedimentation process to yield towards the liquid reservoir 4 and thus, from being at least partially dissolved again in the liquid or viscous carrier 3.

As indicated in FIG. 4a, the retaining means 10 is preferably a diminution 25 of inner the diameter d2 of the liquid channel 21 formed within the dispensing head 5. Accordingly, the sedimentation plug 7 formed at a dispensing head side of the retaining means 10 are supported by the diminution 25 when the container 1 is stored with the outlet 6 at a higher position than the liquid reservoir 4.

FIG. 4b shows another embodiment in which the retaining means 10 comprise a specifically formed reservoir 26 within the dispensing head 5, which is preferably of essentially spherical shape. Thereby, a diminution 25 is present between the reservoir 26 and the liquid reservoir 4 such that a sedimentation plug 7 formed within the reservoir 26 during the sedimentation process can be effectively supported therein, irrespective of the orientation of the container 1. Thereby, the dispensing head 5 is preferably of resilient material in order to enable a widening of the outlet 6 during the dispensing process, i.e. during squeezing of the container 1. Accordingly, the plug 7 formed within the reservoir 26 can effectively be expelled therefrom during the dispensing process.

FIG. 4c shows another preferred embodiment of the retaining means 10 which are formed as a grid-like obstacle 27 between the dispensing head 5 and the liquid reservoir 4. Threreby, the grid 27 preferably comprises a multitude of openings 28 which have a diameter that lies between 0.05 and 0.8 mm.

The retaining means 10 according to the present invention are preferably formed as integral parts of the container. However, it is to be understood that the retaining means 10 may as well be an additional part provided to the container 1 after or before filling of the container 1 with the ingredients 2, 3.

It is to be understood that for sealing the outlet 6 an additional membrane or foil (not shown) may be sealed to the outer side of the at least one outlet 6 according to the embodiments shown in FIGS. 2a to 4c in order to seal the ingredients 2, 3 within the container 1.

Although the present invention has been described above in the context of probiotics or a suspension of probiotics, the invention can equally be applied to any type of: solid, semi-solid or non soluble entity (possibly in suspension in a liquid or viscous matrix), precipitate, sediment, crystals, minerals, solid or non-soluble extracts (such as vegetable extracts, ingredients, food ingredients or mix of ingredients), fibers (such as non digestible fibers and/or vegetable fibers), prebiotics, symbiotics, sugars, coated beads (preferably inert and/or non-toxic and/or edible and/or fibrous beads), possibly with coating thereof comprising a bioactive and/or a probiotic and/or a prebiotic and/or a functional food ingredient and/or a drug and/or a medicament), and combination thereof.

In one embodiment the probiotic is provided in a matrix that enhances the sedimentation process. Such matrix can comprise sugar (such as maltodextrin), oil (such as triglycerides, Medium Chain Triglycerides, Long Chain PolyUnsaturated fatty acids (LC-PUFA) or the like, mineral carriers, pH modifiers such as acids, and the like. Such enhancement of sedimentation can be lead for example by density or by loss of solubility (enhancement of precipitations).

Although the present invention has been described with reference to preferred embodiments thereof, many modifications and alternations may be made by a person having ordinary skill in the art without departing from the scope of this invention which is defined by the appended claims.

The invention claimed is:

1. A dispensing container for a probiotic in a viscous or liquid carrier, the probiotic having a higher specific weight than the viscous or liquid carrier:
   the container comprises a reservoir for holding the carrier and a dispensing head being in fluid connection with the reservoir, the dispensing head comprising at least one outlet; and
   the concentration of the probiotic decreases from the outlet of the dispensing head towards a bottom portion of the reservoir.

2. A dispensing container according to claim 1, wherein an aggregated portion of probiotic is present at the outlet of the container.

3. A dispensing container according to claim 2, wherein the portion of probiotic is a sedimentation cake which is arranged to essentially plug the one outlet of the dispensing head.

4. A dispensing container according to claim 2, wherein the portion of probiotic is arranged to be held at the outlet of the dispensing head regardless of the orientation of the container.

5. A dispensing container according to claim 1, wherein the dispensing head comprises a retainer designed to support the probiotic at the dispensing head and/or the outlet.

6. A dispensing container according to claim 5, wherein the retainer is a geometrical obstacle formed integral with the dispensing head.

7. A dispensing container according to claim 5, wherein the retainer is a reduction of the cross sectional area of the outlet and/or of the dispensing head.

8. A dispensing container according to claim 5, wherein the retainer is designed to be deformed and/or dislocated during a dispensing from the container.

9. A dispensing container according to claim 1, wherein the container is a squeezable single-use container.

10. A dispensing container according to claim 2, wherein the aggregated portion of probiotic is designed to be flushed out of the container upon exertion of a force thereon.

11. A dispensing container according to claim 1, wherein the container comprises a breakable seal arranged at the outlet of the dispensing head and connected to an opening.

12. A dispensing container according to claim 1, wherein the volume of the reservoir of the container is between 0.2 to 5 ml.

13. A dispensing container according to claim 1, wherein the carrier contains between 10e4 and 10e11 CFUs (Colony forming Units) of probiotic.

14. A dispensing container according to claim 1, wherein the probiotic is provided together with or in a matrix enhancing the sedimentation process.

15. A dispensing container according to claim 1 wherein the probiotic is replaced or accompanied by any entity from the group consisting of: a solid, semi-solid or non soluble entity, precipitate, sediment, crystals, minerals, solid or non-soluble extracts, fibers, prebiotics, symbiotics, sugars, coated beads and combinations thereof.

16. A method for enclosing a non-homogeneous solution of probiotic in a viscous or liquid carrier within a dispensing container, the method comprising the steps of:
   filling the non-homogeneous solution in a reservoir of a dispensing container being connected to a dispensing head of the container having at least one outlet;
   closing an outlet by use of an externally provided seal;
   plugging the outlet by specifically sedimenting the probiotic opposite to a bottom portion of the reservoir.

17. The method according to claim 16, wherein the plugging of the outlet is achieved by a centrifugation of the dispensing container.

18. The method according to claim 16, wherein plugging of the at least one outlet is achieved by arranging the container with the outlet facing downwards in an external support packaging having the seal designed to seal the outlet during the sedimentation process.

* * * * *